US 6,734,843 B2

(12) United States Patent
Bertram et al.

(10) Patent No.: US 6,734,843 B2
(45) Date of Patent: May 11, 2004

(54) REDUCED NOISE TOUCH SCREEN APPARATUS AND METHOD

(75) Inventors: William K. Bertram, Reno, NV (US); Logan L. Pease, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/279,300

(22) Filed: Oct. 24, 2002

(65) Prior Publication Data

US 2003/0058226 A1 Mar. 27, 2003

Related U.S. Application Data

(62) Division of application No. 08/294,227, filed on Aug. 22, 1994, now Pat. No. 6,476,798.

(51) Int. Cl.[7] .................................................. G09G 5/00
(52) U.S. Cl. .................... 345/173; 345/174; 345/180
(58) Field of Search ................................. 345/173, 174, 345/179, 180, 181, 104; 178/18.01–18.11, 19.01–19.07; 341/22, 32, 33, 34

(56) References Cited

U.S. PATENT DOCUMENTS

| | | | |
|---|---|---|---|
| 3,382,588 A | 5/1968 | Serrell et al. ..................... 35/9 |
| 3,466,391 A | 9/1969 | Ellis ............................ 178/18 |
| 3,482,241 A | 12/1969 | Johnson ...................... 340/337 |
| 3,591,718 A | 7/1971 | Asano et al. ................... 178/19 |
| 3,622,105 A | 11/1971 | Buchholz et al. ........... 244/77 D |
| 3,632,874 A | 1/1972 | Malavard et al. .............. 178/18 |
| 3,699,439 A | 10/1972 | Turner ...................... 324/71 R |
| 3,732,369 A | 5/1973 | Cotter .......................... 178/18 |
| 3,732,557 A | 5/1973 | Evans et al. ............. 340/324 R |
| 3,757,322 A | 9/1973 | Barkan et al. |
| 3,798,370 A | 3/1974 | Hurst ............................ 178/18 |
| 3,815,127 A | 6/1974 | Blumke et al. .......... 340/365 S |
| 3,836,909 A | 9/1974 | Cockerell .............. 340/365 C |
| 3,971,013 A | 7/1976 | Challoner et al. .......... 340/337 |
| 3,999,012 A | 12/1976 | Dym ............................ 178/18 |
| 4,018,989 A | 4/1977 | Snyder et al. ................. 178/18 |
| 4,022,971 A | 5/1977 | Rodgers ....................... 178/19 |
| 4,029,899 A | 6/1977 | Gordon ........................ 178/19 |
| 4,055,726 A | 10/1977 | Turner et al. ................. 178/18 |
| 4,079,194 A | 3/1978 | Kley ............................ 178/18 |
| 4,088,904 A | 5/1978 | Green ......................... 307/308 |
| 4,103,252 A | 7/1978 | Bobick ......................... 331/48 |
| 4,110,749 A | 8/1978 | Janko ..................... 340/365 C |
| 4,112,415 A | 9/1978 | Hilbrink ............ 340/146.3 SY |
| 4,129,747 A | 12/1978 | Pepper ........................ 178/19 |

(List continued on next page.)

FOREIGN PATENT DOCUMENTS

| | | | |
|---|---|---|---|
| DE | 3511353 | 10/1986 | ............. G06F/3/02 |
| EP | 199243 | 10/1986 | |
| EP | 434314 | 6/1991 | |

(List continued on next page.)

OTHER PUBLICATIONS

Teixeira, et al., "The Sylvania data tablet: A new approach to graphic data input", Spring Joint Computer Conference 1968, pp. 315–321.

*Primary Examiner*—Dennis-Doon Chow
(74) *Attorney, Agent, or Firm*—George H. Gerstman; Seyfarth Shaw LLP

(57) ABSTRACT

A touch screen having a high or fine resolution at relatively low cost is provided. In one embodiment, electrodes are placed directly on the surface of a CRT screen without the need for an electrode positioned on the rear surface. The touch screen may include a conductive coating and a protective coating which are preferably provided in a single vacuum chamber step. A high gain system including a high-frequency sampling bandpass filter provide discrimination of the desired signal over noise. A screen calibration technique is used to achieve linearization in order to convert the electric signals obtained from the screen into data indicative of the position of a touch on the screen.

19 Claims, 8 Drawing Sheets

U.S. PATENT DOCUMENTS

| | | | | |
|---|---|---|---|---|
| 4,175,239 | A | 11/1979 | Sandler | 307/116 |
| 4,177,354 | A | 12/1979 | Mathews | 178/18 |
| 4,177,421 | A | 12/1979 | Thornburg | 324/61 R |
| 4,178,481 | A | 12/1979 | Kley | 178/18 |
| 4,186,392 | A | 1/1980 | Holz | 340/712 |
| 4,198,539 | A | 4/1980 | Pepper | 178/18 |
| 4,214,122 | A | 7/1980 | Kley | 178/18 |
| 4,221,975 | A | 9/1980 | Ledniczki et al. | 307/116 |
| 4,230,967 | A | 10/1980 | Holz et al. | 315/3 |
| 4,233,593 | A | 11/1980 | Bigelow | 340/365 C |
| 4,235,522 | A | 11/1980 | Simpson et al. | 350/266 |
| 4,242,676 | A | 12/1980 | Piguet et al. | 340/711 |
| 4,264,903 | A | 4/1981 | Bigelow | 340/365 C |
| 4,281,323 | A | 7/1981 | Burnett et al. | 340/712 |
| 4,286,289 | A | 8/1981 | Ottesen et al. | 358/125 |
| 4,291,303 | A | 9/1981 | Cutler et al. | 340/711 |
| 4,293,734 | A | 10/1981 | Pepper | 178/18 |
| 4,305,007 | A | 12/1981 | Hughes | 307/116 |
| 4,305,071 | A | 12/1981 | Bell et al. | |
| 4,307,383 | A | 12/1981 | Brienza | 340/365 R |
| 4,353,552 | A | 10/1982 | Pepper | 273/85 G |
| 4,361,725 | A | * 11/1982 | Dagnelie et al. | 345/173 |
| 4,371,746 | A | 2/1983 | Pepper | 178/18 |
| 4,374,381 | A | 2/1983 | Ng et al. | 340/711 |
| 4,379,287 | A | 4/1983 | Tyler et al. | 340/365 C |
| 4,431,882 | A | 2/1984 | Frame | 200/5 A |
| 4,435,616 | A | 3/1984 | Kley | 178/18 |
| 4,455,452 | A | 6/1984 | Schuyler | 178/18 |
| 4,475,235 | A | 10/1984 | Graham | 382/3 |
| 4,476,463 | A | 10/1984 | Ng et al. | 340/712 |
| 4,484,038 | A | 11/1984 | Dorman et al. | 200/5 A |
| 4,523,654 | A | 6/1985 | Quayle et al. | 178/19 |
| 4,567,470 | A | 1/1986 | Yoshikawa et al. | 340/365 C |
| 4,595,913 | A | 6/1986 | Aubuchon | 340/365 C |
| 4,600,807 | A | 7/1986 | Kable | |
| 4,621,257 | A | 11/1986 | Brown | 340/365 P |
| 4,622,437 | A | 11/1986 | Bloom et al. | 178/18 |
| 4,623,757 | A | 11/1986 | Marino | 178/18 |
| 4,639,720 | A | 1/1987 | Rympalski et al. | 340/712 |
| 4,649,232 | A | 3/1987 | Nakamura et al. | 178/18 |
| 4,649,499 | A | 3/1987 | Sutton et al. | 364/518 |
| 4,653,086 | A | 3/1987 | Laube | 379/96 |
| 4,661,655 | A | 4/1987 | Gibson et al. | 178/18 |
| 4,675,569 | A | 6/1987 | Bowman et al. | 310/328 |
| 4,680,429 | A | 7/1987 | Murdock et al. | 178/19 |
| 4,680,430 | A | 7/1987 | Yoshikawa et al. | 178/19 |
| 4,684,801 | A | 8/1987 | Carroll et al. | 250/221 |
| 4,686,332 | A | 8/1987 | Greanias et al. | 178/19 |
| 4,687,885 | A | 8/1987 | Talmage et al. | 178/18 |
| 4,694,279 | A | 9/1987 | Meno | 340/347 P |
| 4,698,460 | A | 10/1987 | Krein et al. | 178/19 |
| 4,698,461 | A | 10/1987 | Meadows et al. | 178/19 |
| 4,707,845 | A | 11/1987 | Krein et al. | 178/19 |
| 4,731,508 | A | 3/1988 | Gibson et al. | 178/18 |
| 4,733,222 | A | 3/1988 | Evans | 340/365 C |
| 4,740,781 | A | 4/1988 | Brown | 340/712 |
| 4,743,895 | A | 5/1988 | Alexander | 340/712 |
| 4,755,634 | A | 7/1988 | Pepper | 178/18 |
| 4,763,356 | A | 8/1988 | Day et al. | 379/368 |
| 4,777,328 | A | 10/1988 | Talmage et al. | 178/18 |
| 4,797,514 | A | 1/1989 | Talmage et al. | 178/18 |
| 4,806,709 | A | 2/1989 | Evans | 178/19 |
| 4,822,957 | A | 4/1989 | Talmage et al. | 178/18 |
| 4,825,212 | A | 4/1989 | Adler et al. | 340/706 |
| 4,839,634 | A | 6/1989 | More et al. | 340/712 |
| 4,853,498 | A | 8/1989 | Meadows et al. | 178/19 |
| 4,873,400 | A | 10/1989 | Rapp et al. | 178/19 |
| 4,875,036 | A | 10/1989 | Washizuka et al. | 340/784 |
| 4,896,223 | A | 1/1990 | Todome | 358/468 |
| 4,910,504 | A | 3/1990 | Eriksson | 340/712 |
| 4,914,624 | A | 4/1990 | Dunthorn | 364/900 |
| 4,922,061 | A | 5/1990 | Meadows et al. | 178/19 |
| 4,924,222 | A | 5/1990 | Antikidis et al. | 341/33 |
| 4,954,823 | A | 9/1990 | Binstead | 341/26 |
| 4,958,148 | A | 9/1990 | Olson | 340/712 |
| 5,016,008 | A | 5/1991 | Gruaz et al. | 341/33 |
| 5,027,115 | A | 6/1991 | Sato et al. | 341/13 |
| 5,053,757 | A | 10/1991 | Meadows | 340/712 |
| 5,241,308 | A | 8/1993 | Young | |
| 5,251,123 | A | 10/1993 | Reiffel et al. | |
| 5,386,219 | A | * 1/1995 | Greanias et al. | 345/174 |
| 5,771,039 | A | * 6/1998 | Ditzik | 345/178 |

FOREIGN PATENT DOCUMENTS

| | | | |
|---|---|---|---|
| GB | 2087611 | 5/1982 | G06F/3/02 |
| JP | 60-117321 | 6/1985 | |
| JP | 61-6727 | 1/1986 | |
| JP | 61-279919 | 12/1986 | |
| JP | 62-169839 | 10/1987 | |
| JP | 63-016322 | 1/1988 | |
| JP | 02-109117 | 4/1990 | |
| JP | 1-111439 | 5/1991 | |
| JP | 03-147012 | 6/1991 | |
| JP | 06-161640 | 6/1994 | |
| WO | WO 80/01762 | 4/1980 | |

* cited by examiner

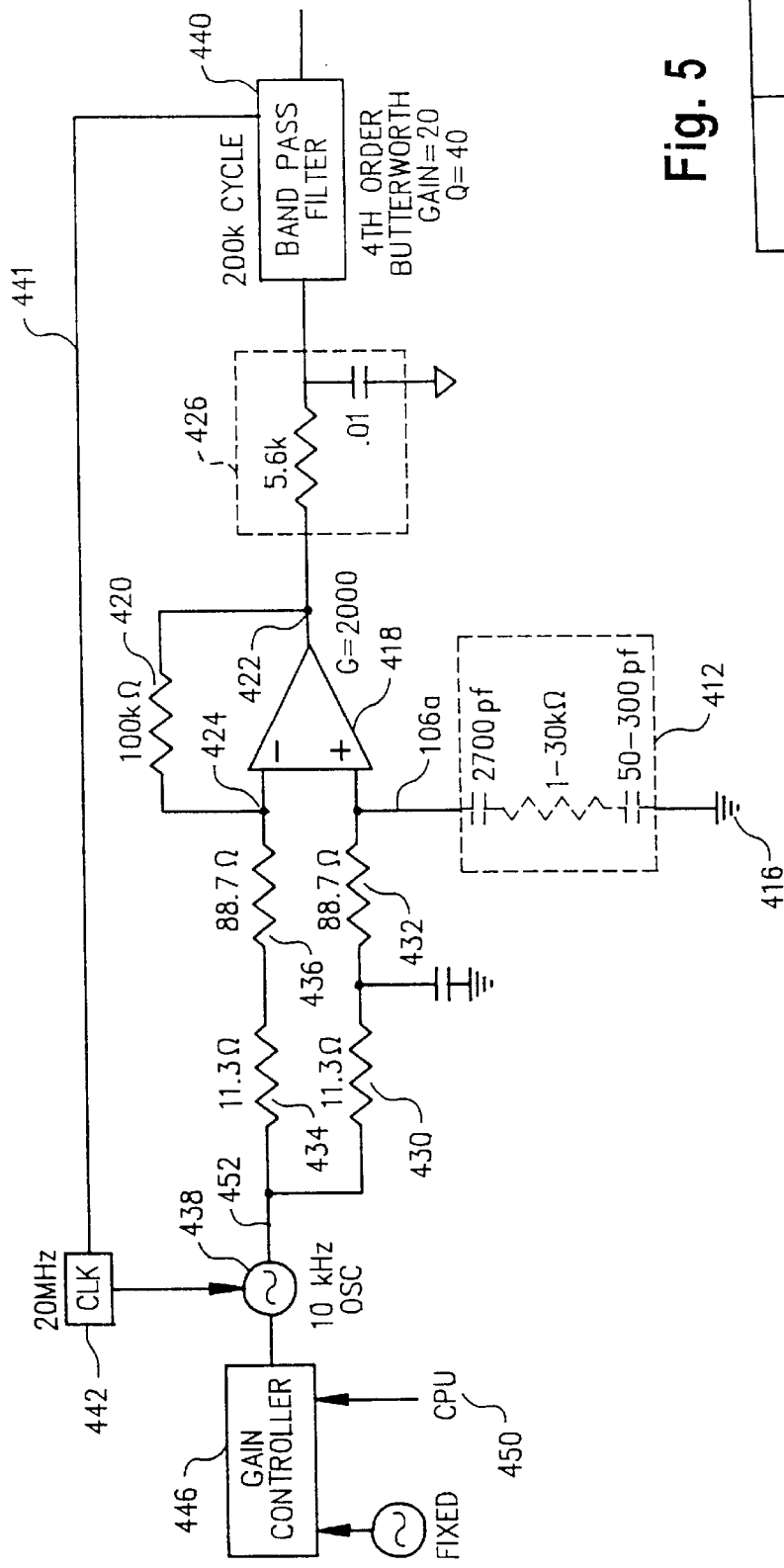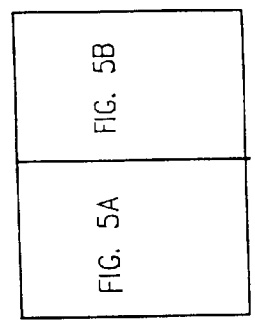

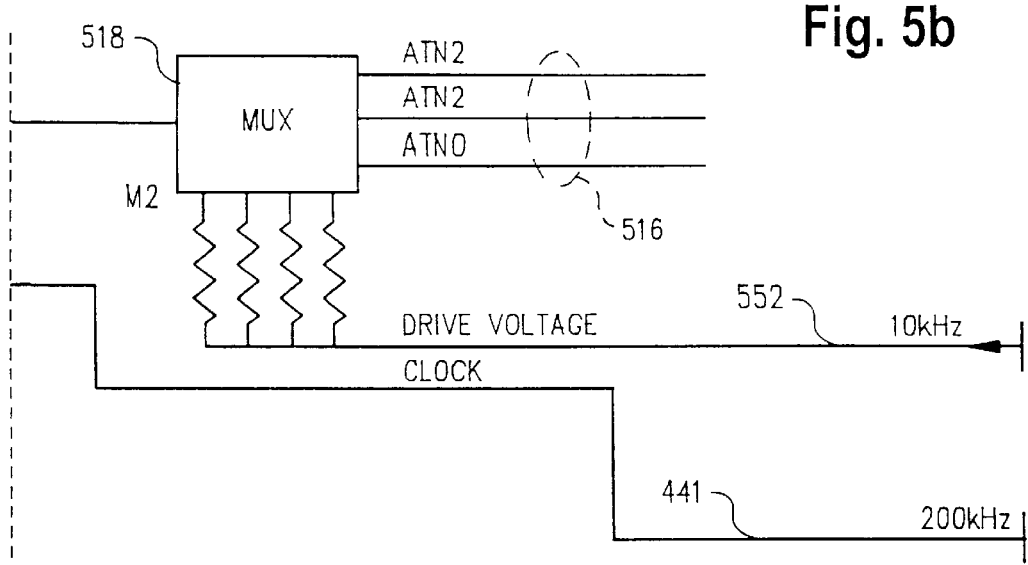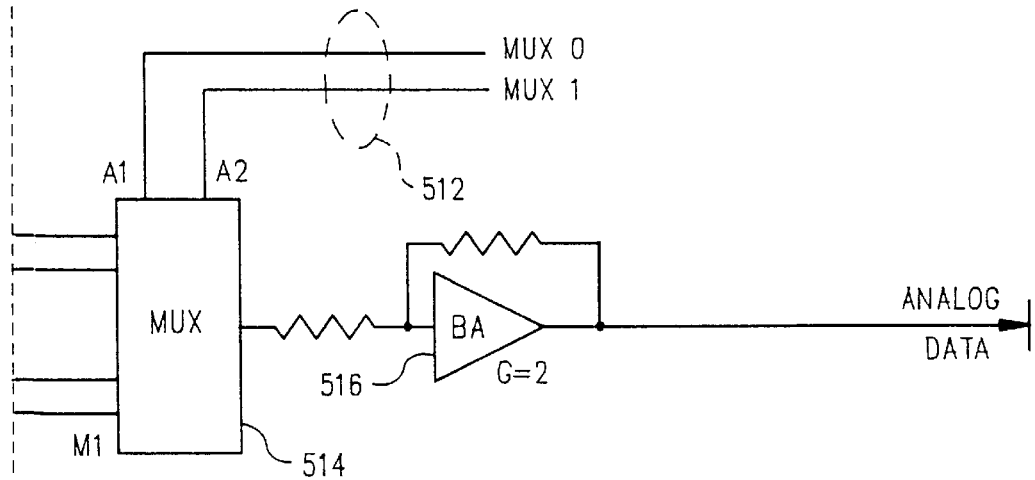
Fig. 5b

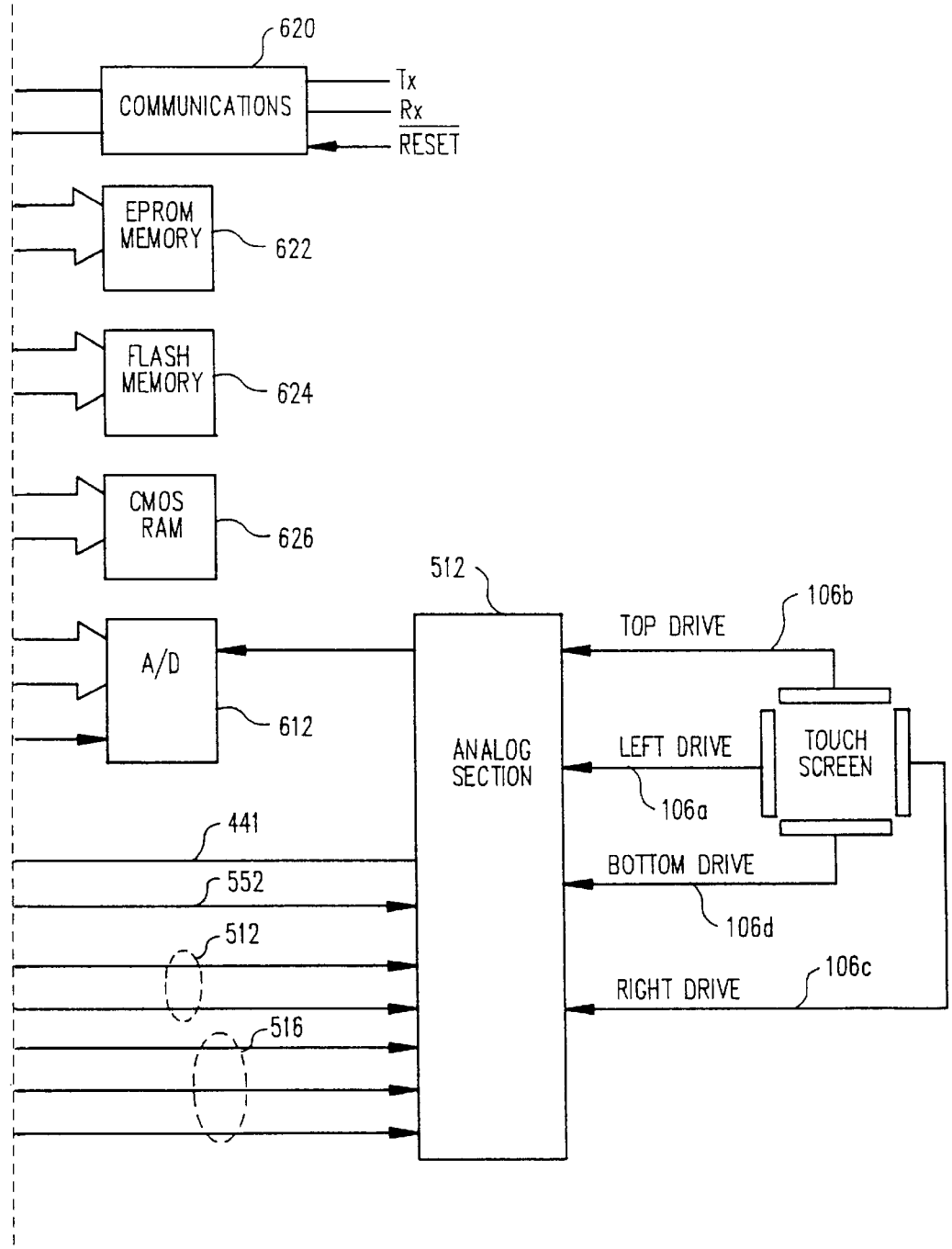

REDUCED NOISE TOUCH SCREEN APPARATUS AND METHOD

This is a division of U.S. application Ser. No. 08/294,227, filed Aug. 22, 1994 now U.S. Pat. No. 6,476,798.

The present invention is directed to a touch screen user input device for a computer and, in particular, to a touch screen having reduced noise while providing high resolution.

BACKGROUND OF THE INVENTION

Touch screens for computer input permit a user to write or draw information on a computer screen or select among various regions of a computer generated display, typically by the user's finger or by a free or tethered stylus. The cost of touch screen displays is partly dependent on the resolution which is desired. When the application requires only gross resolution (such as determination, within about two inches or more, of the position of the finger or stylus on the screen) only moderate expense is typically involved. However, when fine resolution is required (i.e., resolution less than about one inch, preferably less than about ½ inch, more preferably less than about ¼ inch and most preferably less than about ⅛ inch), the expense of touch screens provided according to previous approaches has been relatively high. One reason for the expense is that additional hardware or methods were needed to distinguish the small signals representing fine-resolution positions or movements from noise (i.e., signals which are not indicative of the position of the finger or stylus). Many previous devices have also been relatively expensive to linearize (i.e., to derive an indication of the location of the finger or stylus based on the output signal from the device). Typically, the position is a non-linear function of the output signal. It is believed that the linearization process, in some previous devices, involves manually modifying the size or shape of screen electrodes. Since this must be individually done for each screen overlay which is produced, the expense can be high.

Another contributor to the high expense of high-resolution touch screens is the need, in some processes, to provide electrodes or other deposited layers on both the front and rear surfaces, and/or to provide two or more separate vacuum processing steps. Further, when the final product is made by positioning or bonding a separate overlay to a computer screen (typically a cathode ray, tube or CRT) this additional step adds further expense to the final product.

Accordingly, it would be useful to provide a touch screen which provides fine resolution while reducing or eliminating noise at a reduced or low cost.

SUMMARY OF THE INVENTION

The present invention provides a low-noise, high-resolution touch screen. According to one embodiment, in order to provide reduction or elimination of noise, which is particularly troublesome for fine resolution devices, a relatively high sampling rate is provided along with a filter which distinguishes signal from the (typically low-frequency) noise. Furthermore, one embodiment of the invention can distinguish the desired signal from spurious signals, such as a grounding or static discharge, by using automatic gain control.

Linearization of the signal includes a measurement of signals from touches at various known screen locations and a conversion from the output signal to the derived finger or stylus location using the measured data, thus eliminating the need for manual or individual changing or "tuning" of electrodes or other features of the screen.

According to one embodiment of the invention, electrodes are placed directly on a CRT or other computer screen. By "directly" is meant that the electrodes are in contact with the CRT, rather than on an overlay which is later bonded to the screen. One embodiment permits the electrodes to be positioned so as to eliminate rear-surface electrodes or layers and so to eliminate one or more vacuum processing steps, preferably requiring only a single vacuum processing step to make a computer screen into a touch screen.

Touch screens according to the present invention can be used for a number of purposes. One purpose involves use for an electronic gaming machine such as an electronic slot machine, an electronic keno machine, and the like. Other uses include uses for ordinary computing, such as computing on a personal computer, laptop computer, palmtop computer, notepad computer, personal communication device, telephone, interactive television and the like, running software such as word processing, spreadsheet, communications, database, programming, networking, and other well-known software. The invention can be used in connection with custom-written software, or in connection with computer operating systems designed for pen computing, such as Penpoint™ of GO Corporation, Windows for Pen Computing™ of Microsoft Corporation, or with operating systems or other software intended for use with a pointing device such as a mouse, trackball, joystick and the like.

BRIEF DESCRIPTION OF THE DRAWINGS

FIG. 4 is a schematic diagram of a touch screen signal processing circuit, according to an embodiment of the present invention;

DETAILED DESCRIPTION OF THE PREFERRED EMBODIMENT

Figure 1:
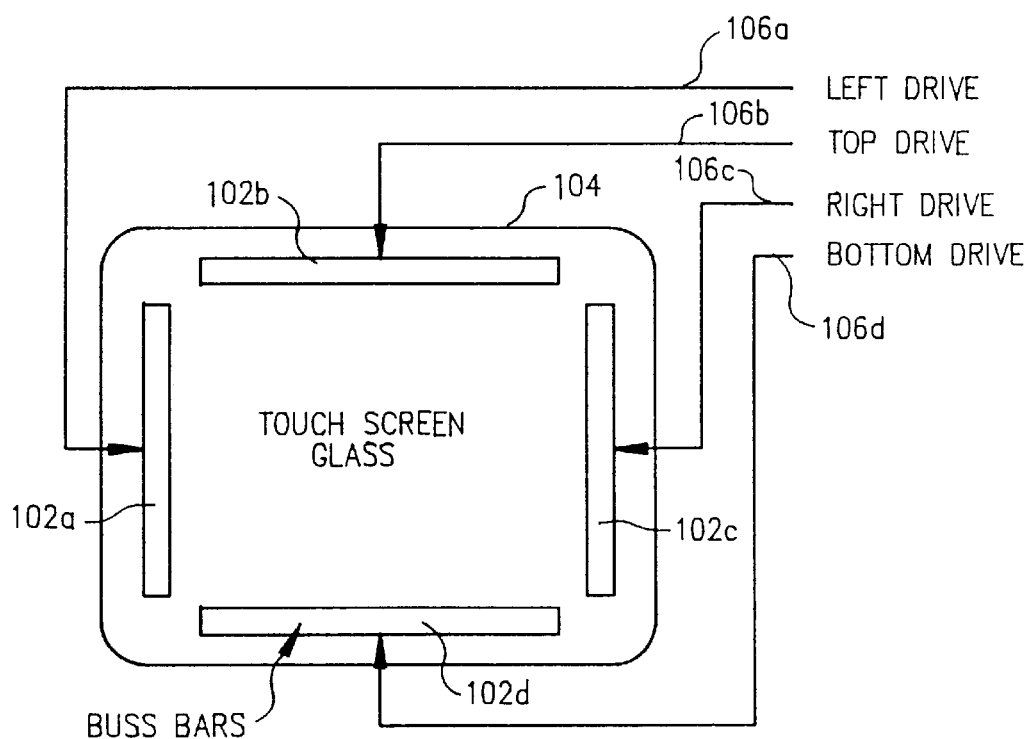
FIG. 1 is a schematic front view of a touch screen according to an embodiment of the present invention.

As shown in FIG. 1, one embodiment of the present invention provides for a computer display device such as a CRT configured so that electrodes 102a–102d overlie perimetrial regions of the screen. A number of configurations for the electrodes 102a, 102b, 102c, 102d are possible. In the embodiment depicted in FIG. 1, the electrodes 102a, 102b, 102c, 102d are in the form of conductive bus bars positioned along the major portion of each of the four edges of the screen 104, preferably without extending into the corner regions of the screen. Conductive wires 106a, 106b, 106c, 106d are in electrical contact with each of the electrodes 102a, 102b, 102c, 102d to provide a communication channel with circuitry described below.

Aspects of the present invention are best understood in the context of previous methods for providing a touch screen.

Figure 2:
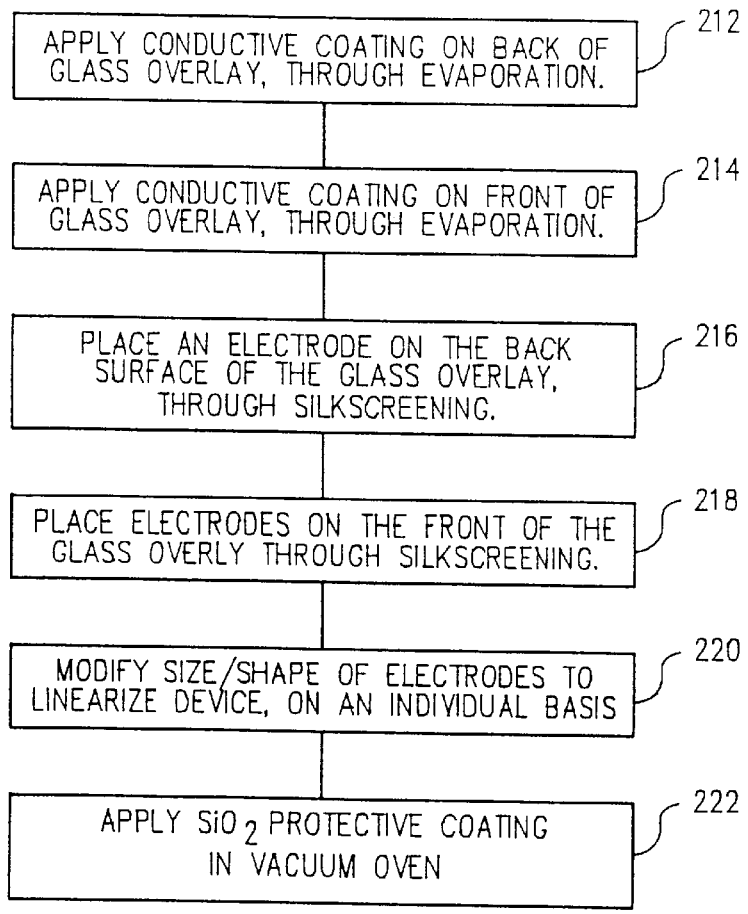
FIG. 2 is a flow chart of a previous touch screen production method.

FIG. 2 shows a method used in connection with making a touch screen according to previous devices. As shown in FIG. 2, previous devices provided touch screens by placing certain elements on a glass overlay which was later bonded to the front surface of a computer screen such as a CRT, e.g., using a transparent adhesive. In previous processes, the glass overlay first had a conductive coating applied to its back surface 212 (i.e., the surface which was to contact or to be bonded to the surface of the CRT). This coating was typically provided through an evaporation process, usually in a vacuum oven. Next, a similar conductive coating was placed on the front of the glass overlay also through an evaporation process 214. After these steps, a further layer was placed on the back surface of the glass overlay. In some cases, a protective layer was provided on the back surface. In most cases, it was necessary to place an electrode on the back surface, often through a silk screening procedure. It is believed that the back electrode was provided in previous devices as part of a noise reduction technique, i.e., a technique for distinguishing the desired position signal from unwanted signals or noise. Next, electrodes were placed on the front surface of the glass, typically through a silk screening process 218. At this point, previous techniques are believed to have included a step of modifying or changing the shape of the electrodes in order to help linearize the device 220. It is believed that this was done on an individual basis in order to "tune" each individual screen so that it provides a known or linear electric field for the overlay. It is believed that this tuning involved measuring electrical characteristics of the screen and scraping or abrading away portions of the electrodes or other parts of the device in order to modify the measured characteristics to fit within predetermined parameters.

Finally, after the "hand tuning" 220, a protective coating such as $SiO_2$ was placed over at least the front surface of the screen in a process conducted in a vacuum oven 222. As can be seen, the process of FIG. 2 includes a number of steps which are relatively expensive including evaporation processes which may require processing in a vacuum oven 212, 214, the placing of at least one deposited layer, such as an electrode on the back surface 216 and hand or individual tuning of the electrodes 220.

Figure 3:
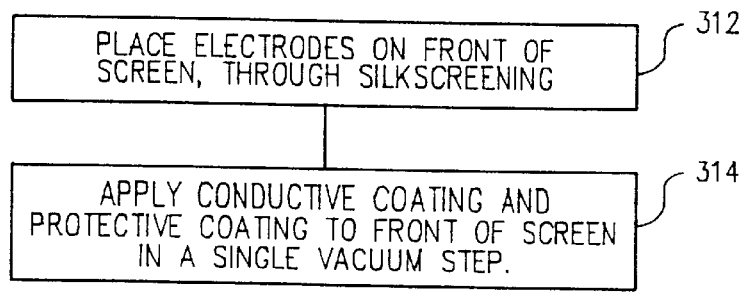
FIG. 3 is a flow chart of a method for providing a touch screen according to an embodiment of the present invention.

FIG. 3 depicts a process according to the present invention for providing a touch screen device. In the embodiment of FIG. 3, electrodes are placed directly on the front glass surface of a computer screen such as a CRT. Although the process of FIG. 3 could also be used for producing a glass or other transparent overlay for a CRT, by placing the electrodes directly on the CRT, it is no longer necessary to include a step of bonding or positioning an overlay over a CRT. Typically, when an overlay is provided, bonding is used rather than merely positioning over a CRT, since bonding helps provide the necessary strength and robustness and also provides desirable optical qualities. However, by placing electrodes directly on the CRT, as shown in FIG. 3, the cost of the bonding (positioning) step is eliminated.

According to the process of FIG. 3, electrodes (such as the electrodes depicted in FIG. 1) are silk screened directly onto the front of the computer screen such as a CRT 312. After the step of silk screening, a conductive coating is applied over the electrodes and the front surface of the screen. Furthermore, a protective coating such as $SiO_2$ is coated on the front of the screen. Preferably, both the conductive coating and the protective coating are applied in a single vacuum step 314, i.e., without the need to remove the CRT from the vacuum oven between the conductive and protective coatings.

A number of materials can be used in connection with the process depicted in FIG. 3. The electrodes can be made of a number of conductive materials including silver and low temperature melting glass and silver epoxies. The conductive coating is preferably done using materials that can be provided in a substantially transparent form such as indium tin oxide or tin antimony oxide. In one embodiment, indium tin oxide is used since it can be applied in a single-step process.

Before describing the details of an embodiment of the present invention, a circuit for dealing with noise, generally as depicted in FIG. 4 will be discussed. Although the circuit of FIG. 4 can be used in connection with a number of touch screen devices, it is particularly useful for the touch screen produced according to the method of FIG. 3, since this method does not involve an electrode on the rear surface of the screen which was a feature believed to have been used by previous devices in connection with noise reduction.

When the touch screen is provided with an electric potential at the electrodes 102a, 102b, 102c, 102d, under normal (non-touch) circumstances, the potential that the electrodes will remain constant in time. When a human touches a portion of the screen, such as with a finger, a small amount of current, such as about 5–10 $\mu$amp per volt of driving potential will flow through the human's body to ground. The apparatus of FIG. 4 is intended to provide a signal from which the value of the current from one of the electrodes through the human body to ground, can be measured in a relatively noise-free manner. The general method used for distinguishing the desired signal from noise involves a relatively high frequency sampling which permits filtering out a lower frequency modulation or "envelope" associated with noise. In order to deduce the amount of current flowing from a given electrode (and thus to permit calculation of distance from the electrode, as described below) it is useful to make some assumption about the electrical characteristics of the human body through which the current flows. For this purpose, the human body is assumed to have electrical characteristics corresponding to a body model 412 having, in series, a first capacitor, resistor and second capacitor. These items are not circuitry items but rather are a model of certain characteristics of the human body. In actual practice, the item 412 will be the path through the human body from the point where the body touches the touch screen to ground 416. One of the lines 106a from the electrode 102a of the touch screen is connected to the positive input of an amplifier such as OP amp 418. Preferably, the OP amp has a relatively high gain, such as a gain of about 2,000 and, in one embodiment, has 127 db common mode rejection. A resistor such as a 100 kilohm resistor 420 connects the output node 422 to the negative input terminal 424. An RC filter 426 is provided at the output of the OP amp 418 in order to reduce dV/dt. This eliminates ringing of the filter and is useful in reducing emissions, e.g., in order to comply with regulations such as Federal Communication Commission (FCC) standards.

In one embodiment, the signal provided to the electrode 102a (via resistors 430, 432) as well as provided to the negative input of the OP amp 418 (via resistors 434, 436) has a generally sinusoidal form provided at a frequency such as 10 kilohertz 438. Similar circuitry is used to provide signals to (and samples signals at) the other electrodes 102b, 102c, 102d, although the phase of the four signals are preferably offset 90°.

Noise rejection is provided by a bandpass filter 440 which samples the amplified electrode signal at a relatively high frequency such as about 100 kilohertz, preferably about 200 kilohertz and more preferably about 250 kilohertz or higher. In one embodiment, the bandpass filter 440 is a fourth order Butterworth filter with a gain of about 20 and a Q factor of about 40. A Butterworth filter provides the advantageous feature of a relatively quick roll-off from the peak and because it performs a high performance-to-cost ratio. However, in some situations the Butterworth filter can be unstable and may, e.g., create ringing. Accordingly, the present invention can also be used with other types of filters. For example, a Bessel filter can be used which tends to be more stable than a Butterworth filter under transient conditions but does not have as rapid a roll-off. Another type of filter that can be used is an elliptical filter.

In the depicted embodiment, both the filter 440 and the oscillator 438 are controlled by a clock signal such as a 20 Mhz signal 442. In one embodiment, the filter provides a sampling rate (defining the time frame over which filtering is applied) of at least three times the clock signal rate 442, in one embodiment, a sampling rate of at least 40 kilohertz. Other devices for high sampling rate and filtering can be used such as a fast-acting rectifier or integrator.

Figure 5A:
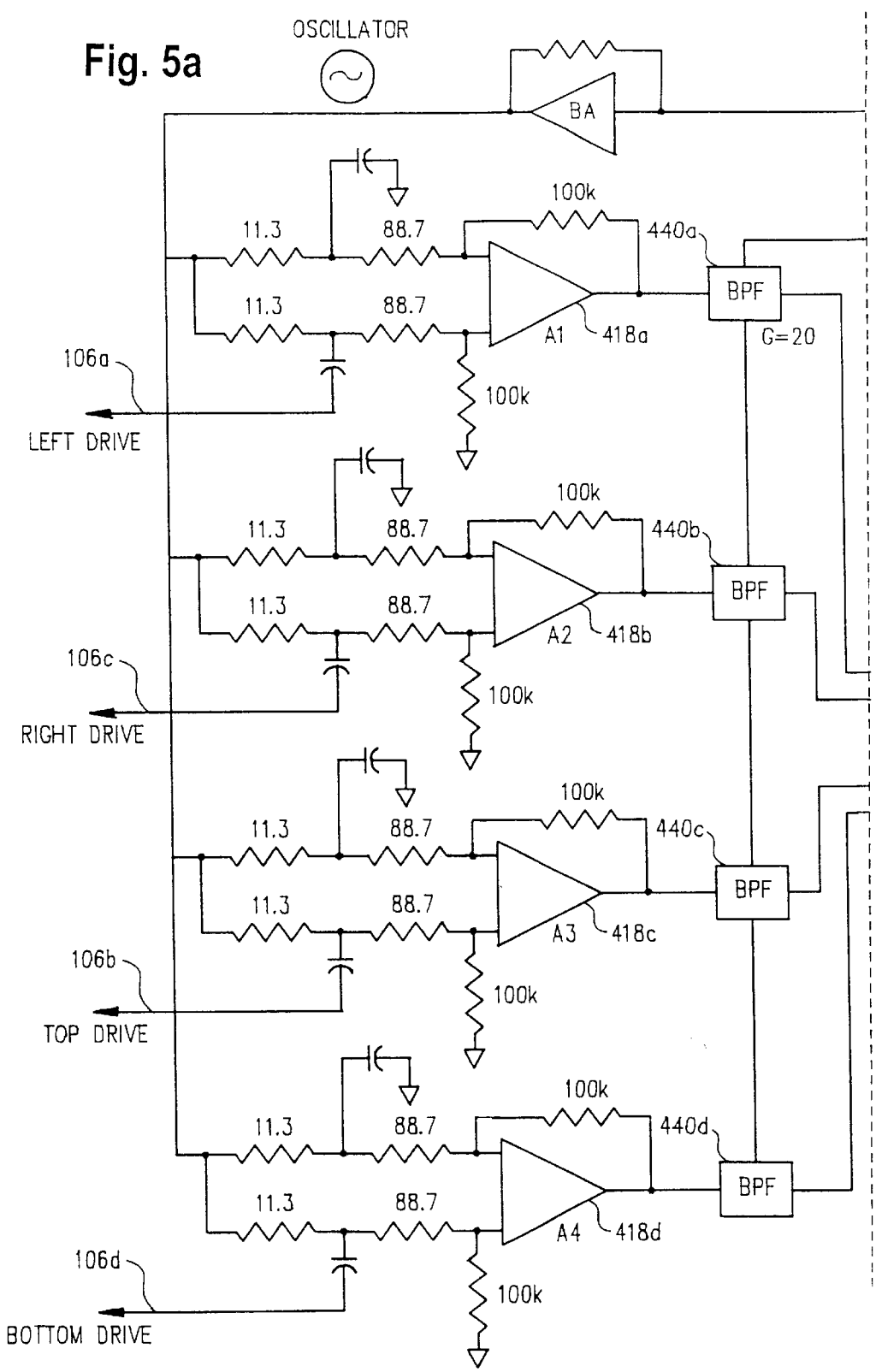
FIG. 5 is a schematic diagram of an analog signal processing device according to an embodiment of the present invention.

The magnitude of the drive signal 438 is set in connection with a gain controller 446. One of the functions of the gain controller 446 is to accommodate a situation in which there is a rapid change in the environment such as may result from the user touching a grounded metal object, thus changing the effective electrical characteristics of the user's body 412. The gain controller 446 receives an indication of the magnitude of the signal received from the touch screen, preferably from information provided by the CPU 450, described below. If any of the four signals becomes greater than a predetermined amount, such as greater than 4.5 volts, the system gain is reduced, lowering the drive signal, i.e., the signal 452 output by the oscillator 438. In the embodiment of FIG. 5, the drive signal 452 is attenuated by attenuation signals 516 controlling multiplexer 518.

Figure 6:
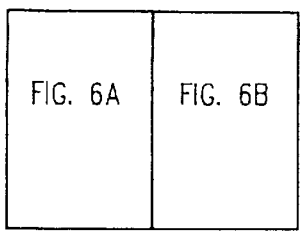
FIG. 6 is a block diagram of a touch screen and associated processing system according to an embodiment of the present invention.
Figure 6A:
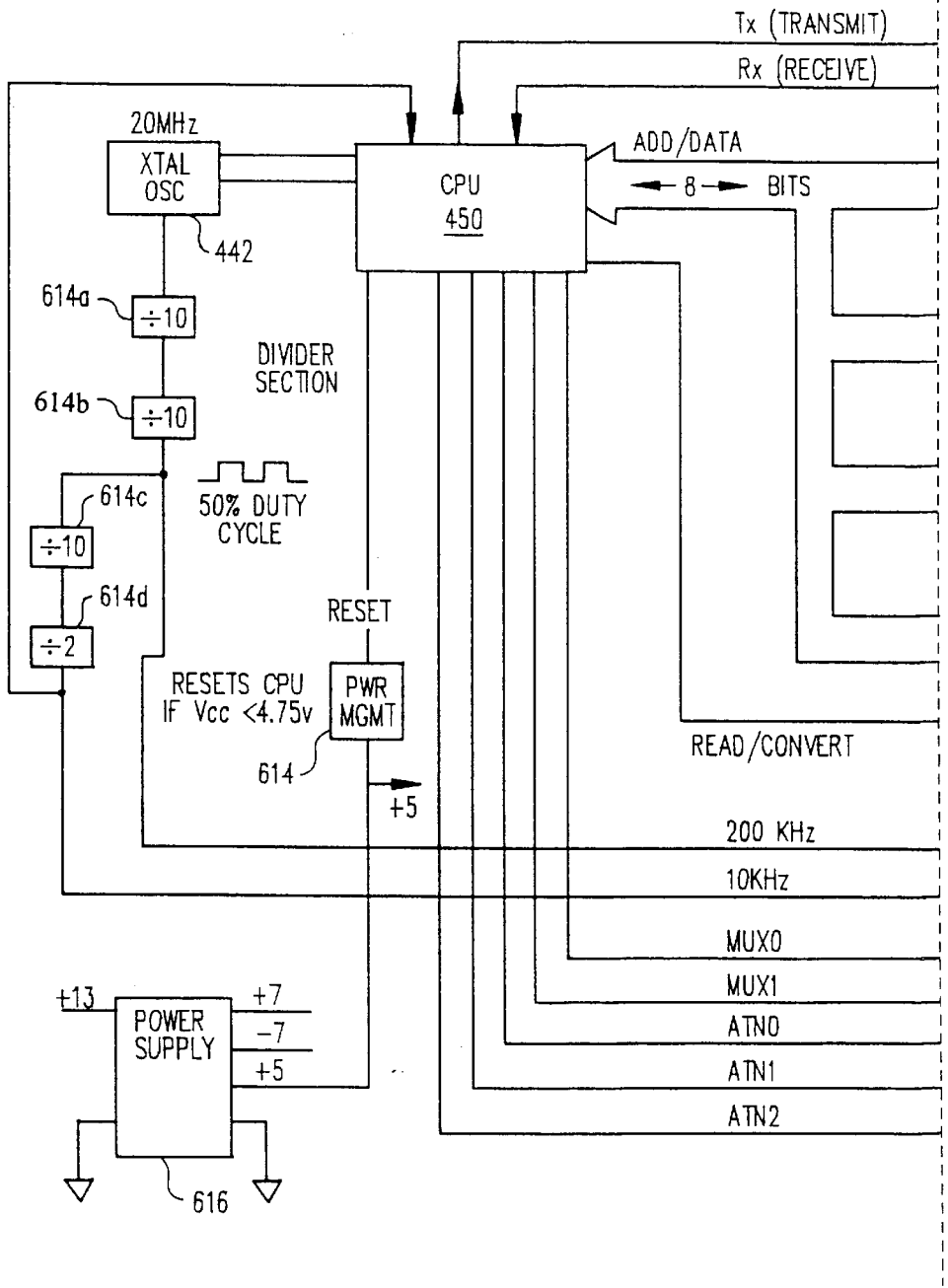
Figure 7:
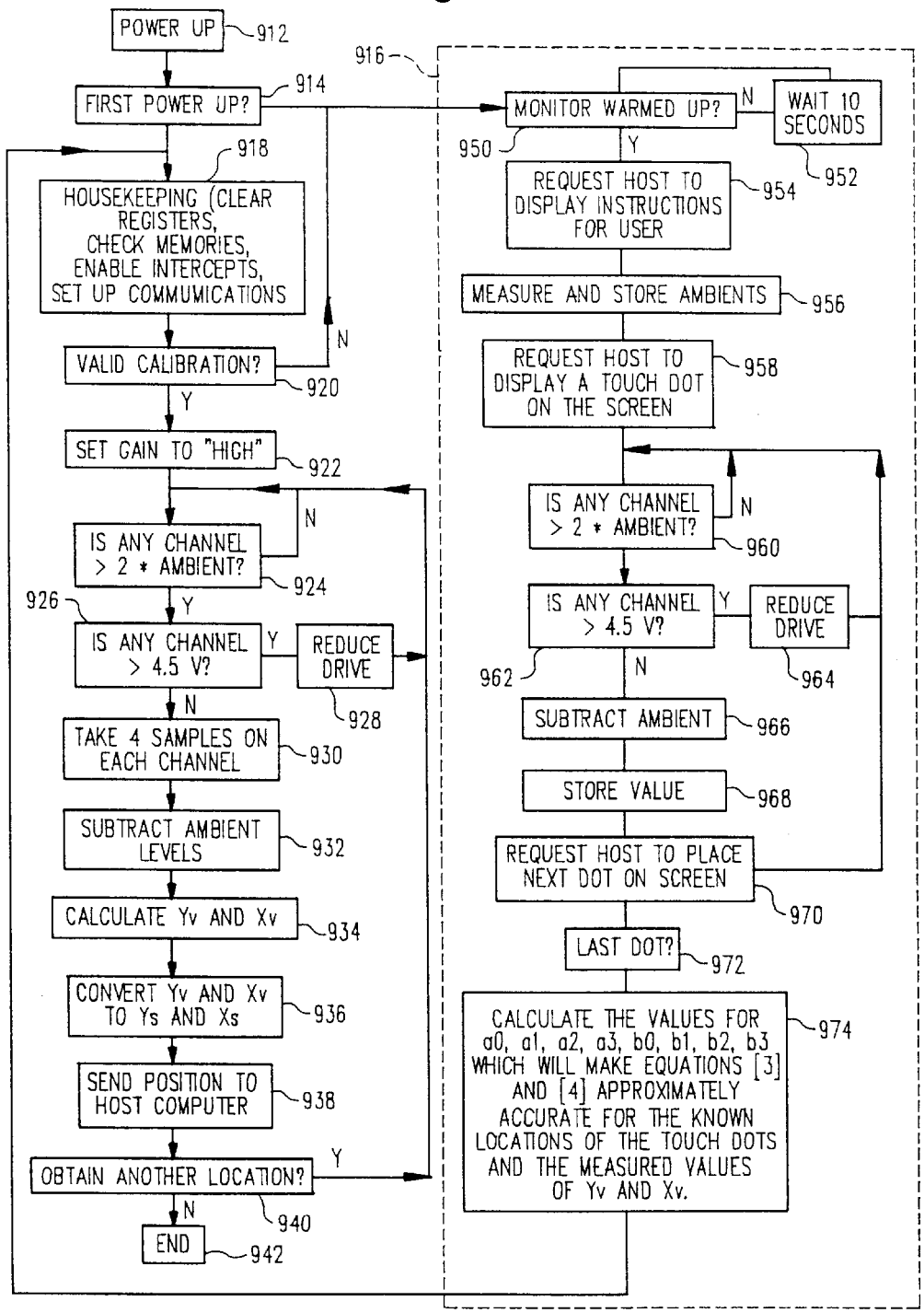
FIG. 7 is a flow chart of a calibration and linearization procedure according to an embodiment of the present invention.

FIGS. 5 and 6 depict one manner of implementing the general configuration of FIG. 4 in a system having four electrodes on a touch screen, as depicted in FIG. 1. FIG. 5 shows the analog section 512 of circuitry in which each of the drives 106a, 106b, 106c, 106d is connected to the positive input of an OP amp 418a, 418b, 418c, 418d. The output of the OP amp, optionally through an RC filter, is connected to a bandpass filter 440a, 440b, 440c, 440d. Under control of control signals mux 0, mux 1 512, a multiplexer 514 selects the outputs from the filters 440a, 440b, 440c, 440d for providing them, one at a time, to an analog to digital converter 612 (FIG. 6). As noted above, the filters 440a, 440b, 440c, 440d are capable of very rapid sampling and, preferably, all four channels are sampled and provided to the A/D converter 612 in less than 800 microseconds, preferably less than 400 microseconds and more preferably, less than 300 microseconds. In one embodiment, the system provides a digital sample of the filtered analog signal at a rate of about 1,000 samples per second (for each of the four electrodes) preferably about 2,500 samples per second, more preferably about 3,000 samples per second or more. Such rapid sampling is used to reduce or eliminate the effects of noise and variation between samples. The analog to digital converter is, according to one embodiment, a 12-bit tracking analog to digital converter.

As depicted in FIG. 6, the central processing unit (CPU) is controlled by a crystal oscillator 442 which also, by means of dividers 614a, 614b, 614c, 614d, provides clock signals 441 and 552 at 200 Khz and 10 Khz, respectively. A power supply 616 provides power to the CPU, preferably via power management circuit 614, preferably configured to reset the CPU 450 if $V_{CC}$ falls below 4.75 volts. Coupled to the CPU is a communication circuit 620 which can, for example, include optical couplers for converting TTL level to a 20 $\mu A$ drive. An EPROM memory 622 is used for storing utility programs and boot strap programs e.g., for downloading program memories. The flash memory 624 is used for storing the main program and is preferably non-volatile memory so that the contents remain intact when the power is off. The flash memory can be reloaded or altered via the communications device. In this way the program in the flash memory can be downloaded from a remote location. The communication front end contains optical couplers for serial data in, serial data out, and a global input for remote master reset. A CMOS memory 626 is used for scratch pad and computation purposes.

A number of CPUs 450 can be used in this regard, although preferably a CPU of the type used in a personal computer environment is preferred.

In operation, the user touches a portion of the screen, the current flowing from each of the four conductors 102a, 102b, 102c, 102d through the body is a function of the distance from the touch to each of the conductors, respectively. Preferably, the screen has a substantially equi-potential surface. Thus, if the user were to touch the screen precisely at the center, equi-distant from the four electrodes 102a, 102b, 102c, 102d, the total current flow through the user's body would be approximately ¾ micro amps or 2 micro amps. For touches which are not at the center, i.e., are closer to some electrodes than to others, the current from the closer electrodes will be greater than that from the farther electrodes. By knowing the relationship between the amount of current and the position on the screen, the amount of current flowing through each of the electrodes through the user can be used to deduce the position of the touch, as described more fully below. Returning to the example of a touch in the center of the screen, as depicted in FIG. 4, the touch current is measured through an 11.3 ohm resistor so that, converted to voltage, the current becomes 22.6 microvolts per volt of drive voltage. The amplifier 418 multiplies the voltage by 2,000 and the bandpass filter 440 adds a gain of 20. As depicted in FIG. 5, the signal selected by multiplexer 514 is provided to buffer amp BA 516 which, in the depicted embodiment, has a gain of 2. Thus, altogether, the system has a gain of 80,000. The signal is provided to the analog to digital converter. The command to convert the analog signal into digital form is synchronized to the output drive oscillator. Synchronization is configured such that when the digital data is obtained, it represents the peak voltage of the touch signal for that channel. Several samples (e.g., four samples per channel) are taken to do an average and to remove any DC value that the sine wave may be riding on.

The digitized voltages for the four electrodes 102a, 102b, 102c, 102d represent the voltages at the left, top, right, and bottom electrodes, respectively and are symbolized by $V_L$, $V_T$, $V_R$ and $V_B$. The digitally represented values of these four voltages are combined to give two voltage values $Y_v$ and $X_v$, representing values in a vertical direction ($Y_v$) and in a horizontal direction ($X_v$) as follows:

$$Y_V = \frac{V_T - V_B}{V_T + V_B} \tag{1}$$

$$X_V = \frac{V_L - V_R}{V_R + V_L} \quad (2)$$

$Y_v$ and $X_v$ are related to the vertical and horizontal position of the touch location on the screen, but the relationship, in general, is not linear. In order to obtain the actual position based on the values of $Y_v$ and $X_v$ a conversion or a linearization procedure is used.

In general, the linearization procedure is a procedure for converting from one co-ordinate system into another co-ordinate system. However, the conversion is general, non-linear and may be different for each particular touch screen, as well as possibly changing in time due to aging, changes in their environment, etc. According, to the present invention, a number of measurements are taken of the values of $Y_v$ and $X_v$ at various known locations on the screen. These measurements are then used to determine the parameters of a conversion method for converting the values of $Y_v$ and $X_v$ into values indicating the location of the touch on the screen. In general, although it is desired to provide a method for converting from the $Y_v$, $X_v$ coordinate system into a screen location coordinate system, the method begins by performing a conversion in the opposite direction, i.e., by defining certain locations in the screen location coordinate system and measuring the values of $Y_v$ and $X_v$, that result from touches at those predefined locations. These values are then used to calculate the parameters which can be used for converting the coordinate systems in the opposite direction, i.e., from the $Y_v$, $X_v$ coordinate system into the screen location coordinate location.

A number of methods can be used for converting between the coordinate systems. In general, conversion systems which are highly accurate require high level of computing resources and/or time. It has been found, however, that the conversion method described below has only moderate computing requirements, but results in a relatively high accuracy or fine-resolution system in which the touch location computed by the system is within a predetermined distance of the actual touch location. In one embodiment, the computed location is within about ⅛ in. of the actual location.

According to one embodiment, a pseudo-linear conversion method is used, employing the following conversion equations:

$$X_s = a_0 + a_1 X_v + a_2 Y_v + a_3 X_v Y_v \quad (3)$$

$$Y_s = b_0 + b_1 Y_v + b_2 X_v + b_3 X_v Y_v \quad (4)$$

Where
  $X_s$ is the calculated horizontal distance from the left edge of the screen.
  $Y_s$ is the calculated vertical distance from the top edge of the screen.

Other conversion methods can be used including higher-order conversion. However, the method of equations 3 and 4 has been found to provide acceptably high resolution, at least for portions of the screen that do not include the corners of the screen.

In the method depicted in FIG. 9, after the device is powered up 912, the system determines whether this is the first power up performed on this system 914 (e.g., by checking a flag). If so, the system performs a calibration procedure 916, described below. Otherwise, a number of housekeeping functions are performed 918 such as clearing registers, checking memories, enabling interrupts and setting up communications. The system then determines whether there is a valid calibration already stored in the system 920. If not, the system then initiates the calibration procedure 916. Otherwise, the system proceeds to set the signal gain to a high level 922, e.g., using the gain controller 446. In the next step, the system performs a check to determine whether the screen is being touched. In the embodiment depicted in FIG. 9, this is determined by checking to see whether any of the four channels 106a, 106b, 106c, 106d indicates a voltage which is more than twice the ambient voltage, i.e., the voltage which is on the four electrodes 102a, 102b, 102c, 102d in the absence of a touch. If not, the system continues to check for a touch 924 until a touch is detected. In one embodiment, determination of the occurrence of a touch is made by detecting a peak of a sampled signal from the filter being above a threshold level. In the case where the sampled signal is represented by the following equation:

$$S = A(\omega t + \phi) + T \sin(\omega t + \phi) \quad (5)$$

wherein=
  S represents the sampled signal;
  A is the amplitude of the sampled signal;
  $\omega$ is the phase angle;
  $\phi$ is the phase of the sampled signal;
  T is the amplitude of the current flowing through the touch apparatus the peak (P) of the sampled equation is a function of an equation having the form:

$$P = (A^2 + B^2)^{1/2} \quad (6)$$

After detecting a touch, the system then checks to make sure that none of the channels 106a, 106b, 106c, 106d indicates a voltage which is greater than a predetermined amount, such as 4.5 volts 926. As discussed above, this check is made in order to detect sudden changes in the environment such as a user touching a grounded metal object or the like. If such a large voltage is detected, the driving voltage is reduced 928 such as by using the gain controller 446 and the system returns to a state of checking to see if there is a touch on the screen.

If the voltage is within the predetermined parameters, the system takes a predetermined number of samples, e.g., four samples on each of the four channels 930 using the high-frequency sampling bandpass filter, A/D converter and other circuitry depicted in FIGS. 5 and 6. The ambient voltages are subtracted 932 and the values $Y_v$ and $X_v$ are calculated according to equations (1) and (2) 934. The $Y_v$ and $X_v$ values are then converted to $X_s$ and $Y_s$ values 936 using equations (3) and (4). The position values $Y_s$ and $X_s$ are then sent to the host computer over communication circuit 620. Normally, the system would be configured to continuously monitor for touches and thus the system would be configured to obtain another location 940 by returning to the state in which the system determines whether any touch of the screen is being made 924. Otherwise, the routine ends 942.

In performing a calibration 916, the system first determines whether the monitor is sufficiently warmed up 950 and cycles through successive ten second wait periods 952 until warm up is completed. Next, the CPU 450 sends a request, via communications device 620 to the host computer, requesting the host computer to display instructions to the user on the touch screen 954. During the time when the user is not touching the touch screen, the computer measures the voltages on the four channels 106a, 106b, 106c, 106d and stores these values, e.g., for use in steps 924 and 932. The CPU 450 then requests the host computer to display a touch dot (a dot or other indicium on the touch screen at a predetermined location). The computer also displays instructions telling the user to touch the screen precisely at the location of the displayed touch dot 958. The system determines whether there is a touch 960 and whether the voltage is in the defined limits 962, 964 as described above for steps 924, 926, and 928. The ambient voltages are subtracted 966 and the measured values are stored 968. The CPU 450 then requests the host computer to place the next dot on the screen 970 in the next predetermined location, unless all the dots have been displayed 972. In one embodiment, a total of nine touch dots or calibration points are used, preferably defining four substantially rectangular and identical quadrants or regions.

After all of the touch dots have been displayed and values of voltages $Y_v$ and $X_v$ have been stored, corresponding to each of the touch dots, the system calculates the parameters $a_0, a_1, a_2, a_3, b_0, b_1, b_2, b_3$, which will be used in equations (3) and (4) 974. This can be done by solving or fitting equations (3) and (4) for each of the variables, $a_0, a_1, a_2, a_3, b_0, b_1, b_2, b_3$. Since nine measurements have been made, this will result in a system of 18 equations and eight unknowns and thus will be overdetermined. Accordingly, a "best fit" method is used to determine values for the unknowns $a_0, a_1, a_2, a_3, b_0, b_1, b_2, b_3$ which provide the best fit to the nine measured values of $X_v$ and $Y_v$. These values of the unknowns are then stored for use in calculating $X_s$ and $Y_s$ in step 936. The system then returns to step 918, described above.

In light of the above description, it will be apparent to those of skill in the art that the present invention provides a number of advantages. The present invention is able to determine the location of a touch on a touch screen with a fine resolution but at a relatively low cost and high rapidity. The present invention reduces costs by eliminating steps such as steps of providing a back electrode and/or back conductive coating and reduces the requirement for the number of steps that must be performed in a separate vacuum chamber processes. The system provides for linearization of the data to determine the location of a touch with a high degree of accuracy without the need for individual manual linearization of touch screen devices.

A number of variations and modifications can be used. It is possible to use some aspects of the invention without using others. For example, it is possible to use the simplified screen production technique of the present invention without using the linearization of FIG. 9 and/or the circuitry of FIGS. 5 and 6. In addition to use in connection with gaming machines, PCs, and other devices as described above, the present invention can also be used in connection with other interactive applications such as locator or navigation devices, automatic teller machines (ATM) in connection with vehicle and/or machinery control devices and the like.

Although the application has been described by way of a preferred embodiment and certain variations and modifications, other variations and modifications can also be used, the invention being defined by the following claims.

That which is claimed is:

1. A touch screen for determination of a touch position with a resolution of less than one inch, comprising:
    a computer screen having a display region with an exterior and an interior surface;
    a transparent conductive coating placed directly on said exterior surface of said computer screen; and
    a plurality of electrodes placed directly on said exterior surface of said computer screen and near edges thereof, in the absence of electrodes spaced from said exterior surface or placed on said interior surface.

2. A touch screen, as claimed in claim 1, wherein said plurality of electrodes are formed from materials selected from the group consisting of silver epoxies and a mixture of silver and low-temperature-melting glass.

3. A touch screen, as claimed in claim 1, wherein said touch screen is provided by a process that includes only a single vacuum step.

4. The touch screen of claim 3 in which said electrodes are placed only near edges of said screen.

5. The touch screen of claim 1 in which said computer screen is a cathode ray tube.

6. The touch screen of claim 5 in which said plurality of electrodes are formed from materials selected from the group consisting of silver epoxies and a mixture of silver and glass.

7. The touch screen of claim 1 in which said electrodes are placed only near edges of said screen.

8. A method of making a touch screen apparatus for detecting touch at a preselected location on a touch screen surface with a resolution of less than one inch, comprising:
    providing a computer screen, having a front surface;
    applying a plurality of bar electrodes directly to the front surface;
    depositing a transparent conductive coating directly on the front surface to provide an electrical path between the bar electrodes; and
    applying a transparent protective coating over the conductive coating, said computer screen being free of electrodes spaced from said front surface.

9. The method of claim 8, wherein the plurality of bar electrodes are made of a glass and silver compound.

10. The method of claim 8, wherein the conductive coating is made of silver epoxy.

11. The method of claim 8, wherein the protective coating is made of indium.

12. A method, as claimed in claim 8, wherein said steps of depositing a transparent conductive coating and said step of applying a transparent protective coating are conducted in a vacuum chamber.

13. The touch screen of claim 12 in which said bar electrodes are placed near edges of said screen.

14. A method, as claimed in claim 8, wherein only a single vacuum process is needed to perform the method of making a touch screen apparatus.

15. A method, as claimed in claim 8, wherein said method of making a touch screen apparatus is performed in the absence of substantially modifying the size or shape of said bar electrodes after said step of applying a plurality of bar electrodes.

16. The method of claim 8 in which said computer screen is a cathode ray tube.

17. The method of claim 16 in which the steps of depositing a transparent conductive coating and the step of applying a transparent protective coating are conducted in a vacuum chamber wherein only a single vacuum process is used.

18. The method of claim 16 wherein the method of making a touch screen apparatus is performed in the absence of substantially modifying the size or shape of said bar electrodes after said step of applying a plurality of bar electrodes.

19. The touch screen of claim 8 in which said bar electrodes are placed near edges of said screen.

* * * * *